United States Patent [19]

Ottewell

[11] Patent Number: 4,757,918
[45] Date of Patent: Jul. 19, 1988

[54] SPREADING APPARATUS

[75] Inventor: James Ottewell, Somerset, Great Britain

[73] Assignee: The Phoenix Engineering Company Limited, Somerset, Great Britain

[21] Appl. No.: 21,468

[22] Filed: Mar. 4, 1987

[51] Int. Cl.⁴ ............................................. E01C 19/12
[52] U.S. Cl. .................................... 222/139; 222/142; 222/265; 222/274; 222/288; 404/110; 239/664; 239/682; 239/650
[58] Field of Search ............... 404/108, 110; 222/624, 222/625, 273–274, 278–279, 238, 288, 297–299, 280–282, 142, 139, 138, 265–269, 414, 410, 626; 239/664, 682, 650

[56] References Cited

U.S. PATENT DOCUMENTS

| | | | |
|---|---|---|---|
| 1,522,382 | 1/1925 | Pain | 239/664 X |
| 2,872,080 | 2/1959 | Thene | 222/238 X |
| 2,953,977 | 9/1960 | Warren | 404/110 |
| 2,954,241 | 9/1960 | Warren | 404/110 X |
| 3,288,041 | 11/1966 | Layton | 404/108 |
| 3,620,419 | 11/1971 | Bailey | 222/624 X |

FOREIGN PATENT DOCUMENTS

| | | | |
|---|---|---|---|
| 507795 | 5/1953 | Belgium | 239/682 |
| 391962 | 5/1933 | United Kingdom . | |
| 762645 | 11/1956 | United Kingdom . | |
| 818055 | 8/1959 | United Kingdom . | |
| 2163631 | 3/1986 | United Kingdom . | |

Primary Examiner—Joseph J. Rolla
Assistant Examiner—Nils Pedersen
Attorney, Agent, or Firm—Rosen, Dainow & Jacobs

[57] ABSTRACT

The spreading apparatus has a main hopper and at least one extension hopper, each having a discharge roller for flowable material such as chippings for road surfacing. The extension hopper is mounted adjacent the main hopper and movable longitudinally to enable variation of the combined width of the hoppers. A baffle cuts off communication between the discharge roller of the extension hopper and the major part of the interior of the extension hopper over a width corresponding to the longitudinal overlap between the main hopper and the extension hopper.

13 Claims, 6 Drawing Sheets

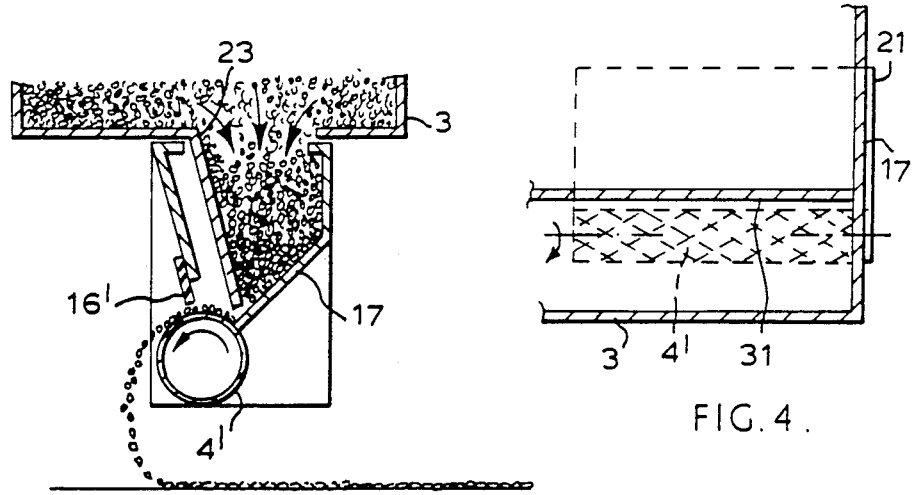
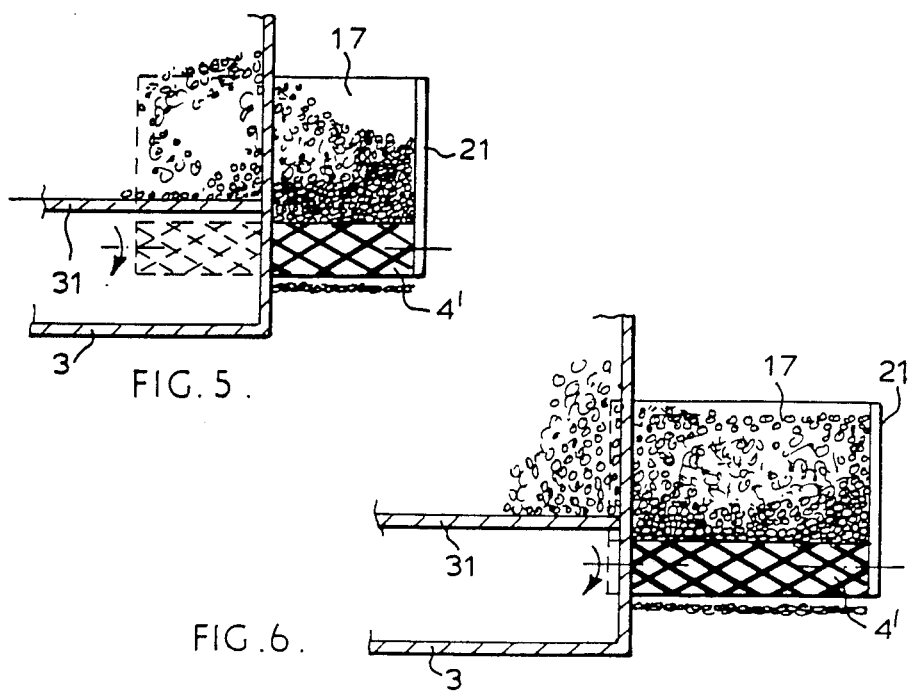

SPREADING APPARATUS

This invention relates to apparatus for spreading flowable material; The apparatus may be used in road-making to spread an aggregate on a sprayed bitumen surface or to spread an aggregate already coated with bitumen, for example. The apparatus may also be used to spread other flowable materials in other fields, such as agriculture.

The invention provides apparatus for spreading flowable material, comprising an elongate main hopper having means for discharging the material over substantially its whole length, an extension hopper also having means for discharging the material over substantially its whole length, the extension hopper being mounted adjacent the main hopper and being movable longitudinally of the main hopper between a retracted position and an extended position in which it projects beyond one end of the main hopper, thereby enabling variation of the combined width of the hoppers, and means for cutting off communication between the discharging means of the extension hopper and the major part of the interior of the extension hopper over a width corresponding to the longitudinal overlap between the main hopper and the extension hopper.

This apparatus provides the advantage that the width over which the material is spread can be varied while the apparatus is moved along. This is particularly useful when spreading material on a road that varies in width. Since the extension hopper is mounted adjacent the main hopper and therefore does not penetrate into it, the extension hopper can be moved without interfering with the flow of material in the main hopper.

Within the range from minimum to maximum combined width of the hoppers (from the retracted position to the extended position), the combined width used during any one of a number of passes of the apparatus over a surface can be selected so that the number of passes required to cover the surface is a minimum. In road surfacing, this minimizes the number of joints, providing a visually better finish and reducing the risk of joint failures.

The apparatus can be used at its maximum width during spreading and then reduced to its minimum width, by retracting the extension hopper, for ease of transportation and access to awkward sites.

The hoppers may be separately fed with the material, but it is preferable for the extension hopper to communicate with the main hopper, so that one is fed via the other. Communication is preferably through an outlet in the underside of the main hopper.

Cutting off communication between the discharging means of the extension hopper and the major part of the interior of the extension hopper over a width corresponding to the longitudinal overlap between the main hopper and the extension hopper has the effect of preventing discharge of the material from the extension hopper in the region of the overlap, thereby facilitating uniform width-wise application of the material. The cut-off means preferably comprises a baffle fixed on the main hopper.

The discharging means of the main hopper and the extension hopper preferably lie on opposite sides of an imaginary vertical plane and discharge towards that plane. As a result, a horizontal surface onto which the material is spread below the discharging means receives the material along an approximately straight line. Thus, no segment of the surface has to be left untreated at the start or finish of the path of travel of the apparatus over the surface.

The particular discharging means used will depend on the nature of the material to be spread. They may comprise longitudinal outlet slots through which the material falls under its own weight or is forced; alternatively they may comprise rows of nozzles. In a preferred embodiment the discharging means comprise driven rollers, thereby facilitating the discharge of the material at a controlled rate. Preferably, each roller cooperates with a resiliently deformable counter-member to define a discharge slot; deformation of the counter-member allows foreign bodies to pass through without damaging the roller. The counter-member may be movable to vary the slot width to suit different materials or rates of application.

In order to facilitate uniform spreading, the extension hopper preferably contains means for distributing the material across the length of the extension hopper. The distributing means may simply agitate or stir the material to encourage it to flow across the length of the hopper under its own weight, but preferably the distributing means is arranged to transport the material along the hopper. The distributing means may conveniently comprise an auger.

In a preferred embodiment there are two said extension hoppers, one at each end of the main hopper.

The invention will be described further, by way of example, with reference to the accompanying drawings, in which:

FIG. 3 is a diagrammatic cross-section through one extension hopper and part of the main hopper;

FIGS. 4 to 6 are diagrammatic longitudinal sections, corresponding to FIG. 3, showing different positions of the extension hopper;

Figures 8, 9:
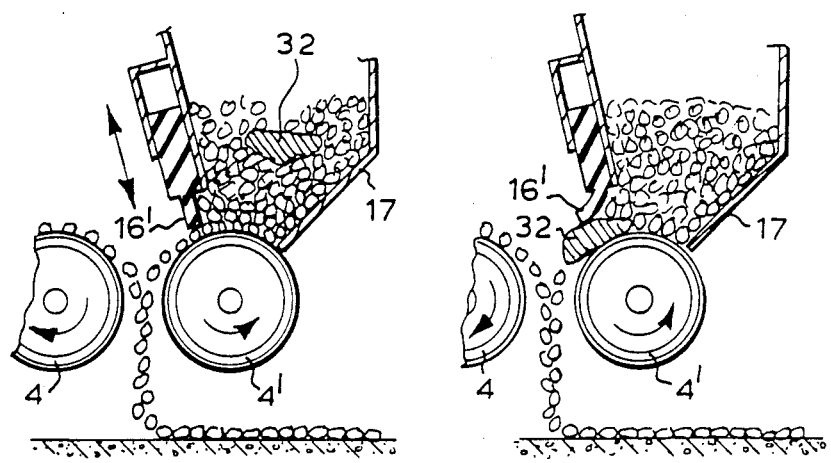
Figure 10:
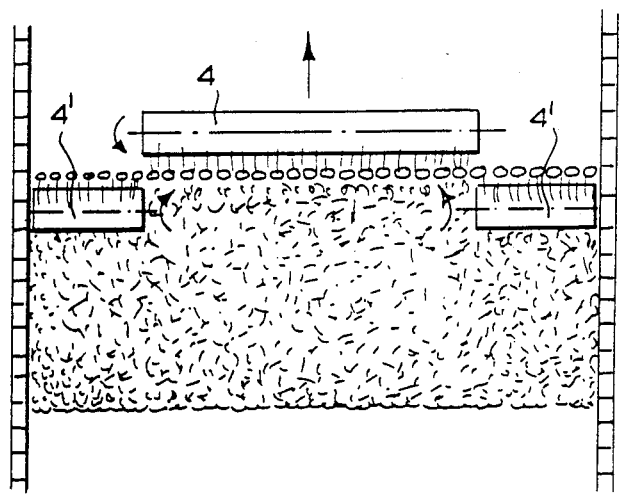
Figure 11:
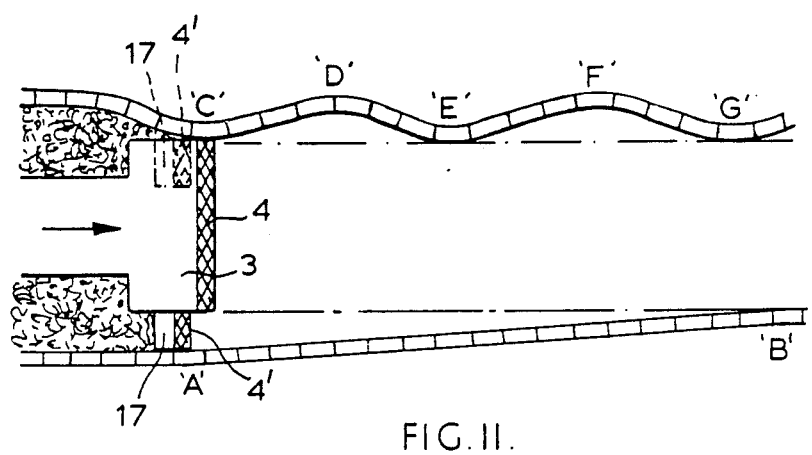
Figure 12:
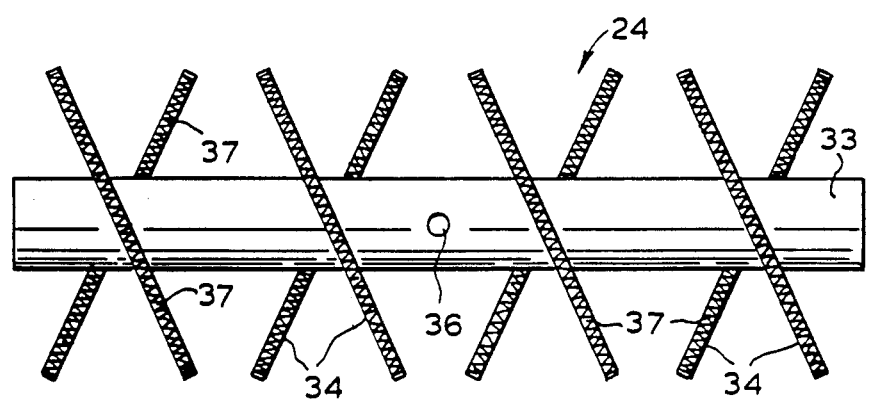
Figure 13:
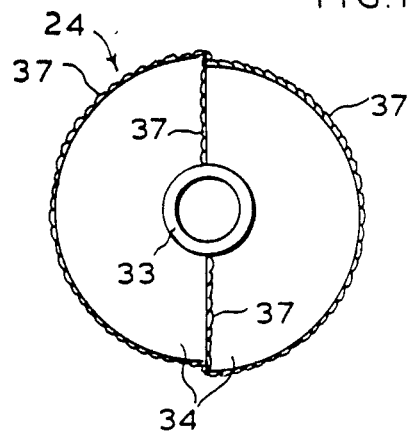

FIGS. 8 and 9 diagrammatically illustrate discharging means in cross-section;

FIG. 10 is a plan view of discharge rollers of the hoppers;

FIG. 11 is a schematic plan view illustrating the operation of the spreader;

FIG. 12 is an elevation of an auger for use in an extension hopper;

FIG. 13 is an end view of the auger; and

Figure 14:
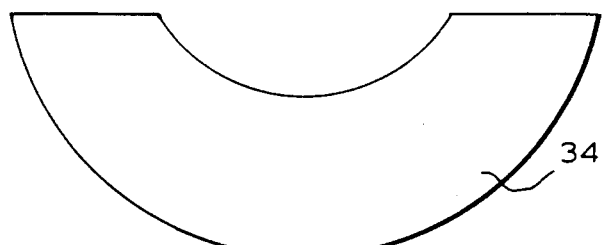

FIG. 14 shows one of the vanes of the auger on an enlarged scale.

The spreader illustrated is intended for applying aggregate chippings to roads. It has four road-engaging wheels 1 (only one of which is visible in FIG. 1), an operator's cab 2, and a conveying system (not shown) for conveying the chippings from a receiver at the rear of the spreader to a main hopper 3 at the front.

The main hopper 3 has a front portion 3a which projects downwards and converges towards a discharging device comprising a discharge roller 4 whose surface has corrugations or ridges. An agitator 6 in the main hopper 3 assists in distributing the chippings throughout the length of the hopper 3 and forwarding them to the discharging device. The agitator 6 and the discharge roller 4 are driven by a hydraulic motor 7 via a common chain 8. The passage cross-section of the hopper 3 is adjustable by means of a sliding plate 9, depending on the material to be spread. The chippings are discharged through a slot defined between the discharge roller 4 and a flexible rubber section 16.

Figure 1:
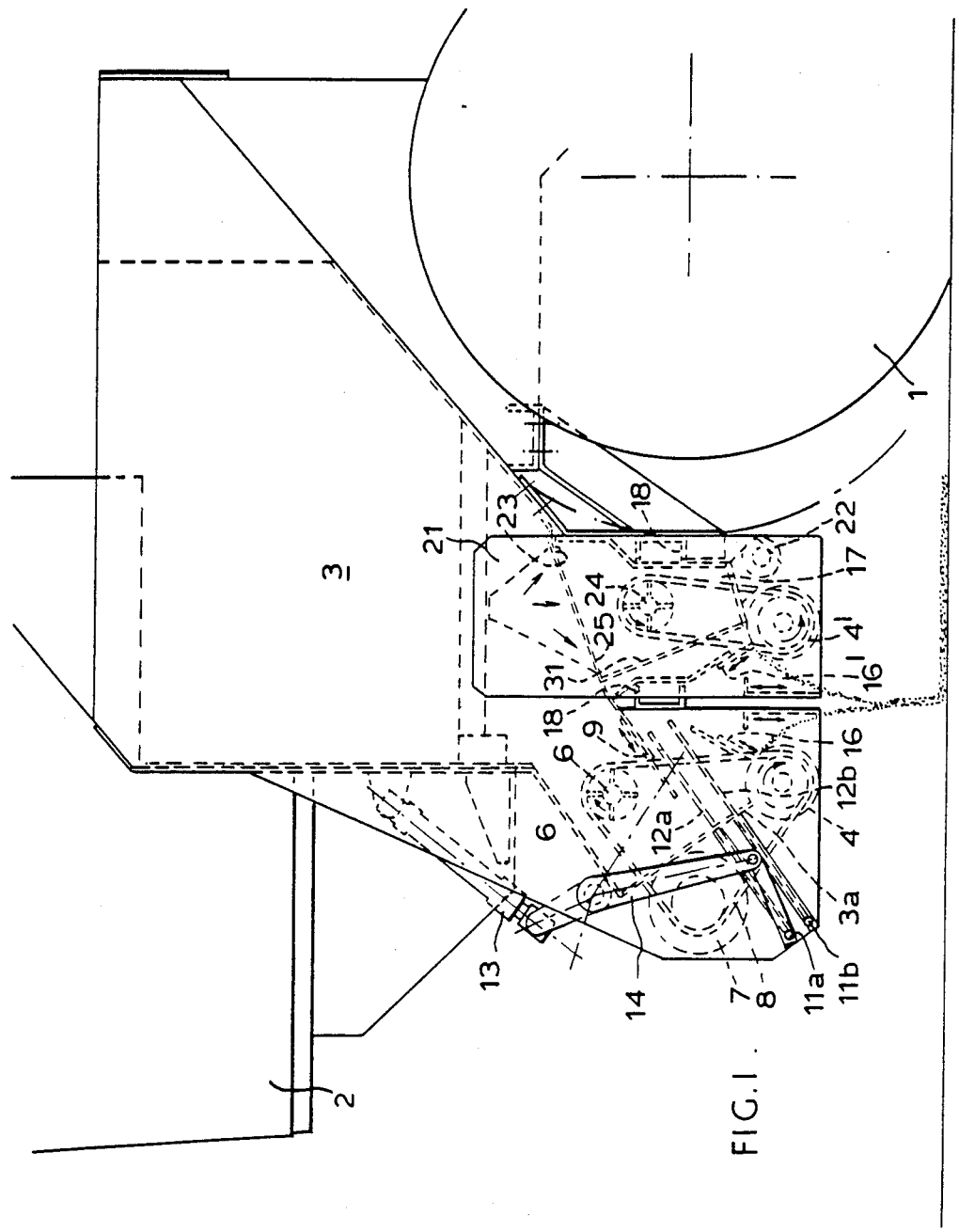
FIG. 1 is a side view of the front part of a chipping spreader for use in road surfacing.

The width of the flow of material to be spread from the hopper 3 can be varied by reducing the passage cross-section of the hopper 3 either from the right or the left by means of a respective one of two sliding gates 12a, 12b of a tapering design; the broken lines in FIG. 1 show the fully extended position of the two gates 12a, 12b (which are, however, never used simultaneously). As shown in FIG. 1, at each end of the main hopper 3, a respective hydraulic ram 13 is connected by a respective linkage 14 to a respective lug 11a on the right-to-left cut-off gate 12a. In the illustrated position of the lug 11a the right-to-left cut-off gate 12 is fully retracted; as it is raised from this position it gradually reduces the width of spread, from the right (as viewed in the direction of travel). If the width is to be reduced from the left, each linkage 14 is disconnected from the respective lug 11a and then connected to a respective lug 11b on the left-to-right cut-off gate 12b.

Figure 2:
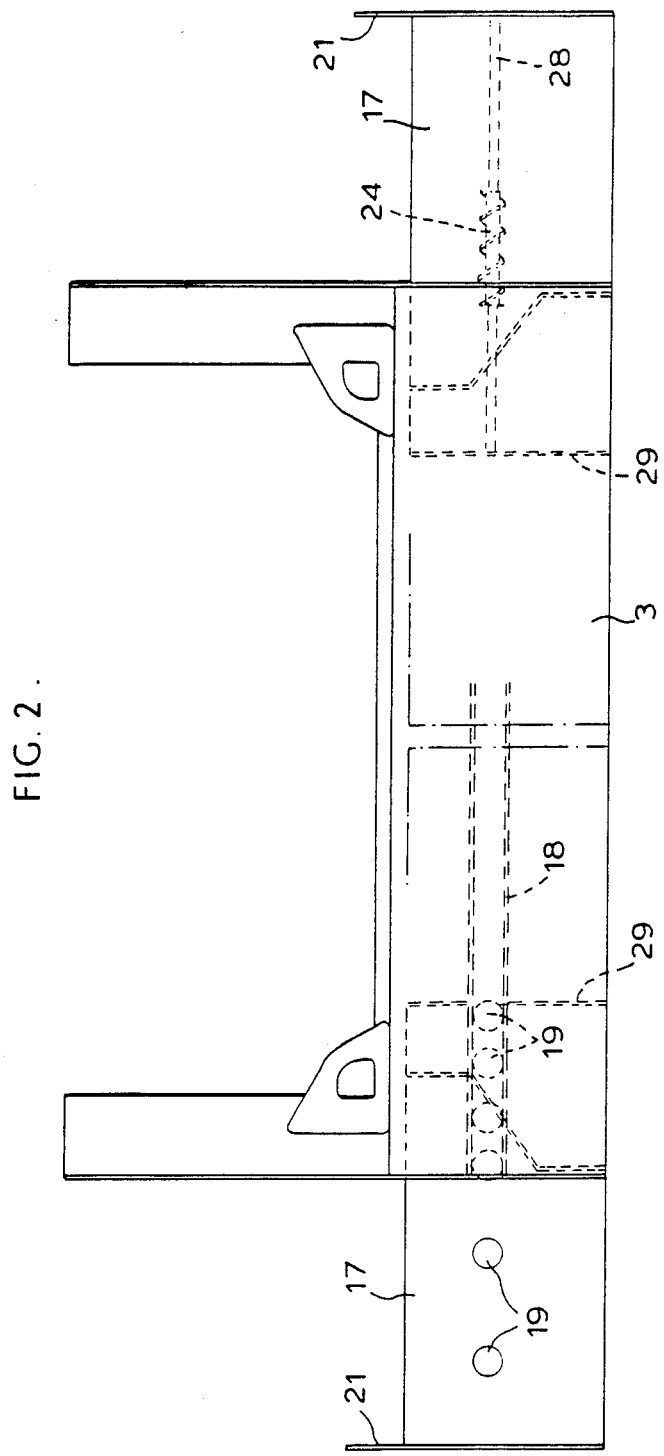
FIG. 2 is a front elevation of the main hopper and the extension hoppers of the spreader.
Figure 7:
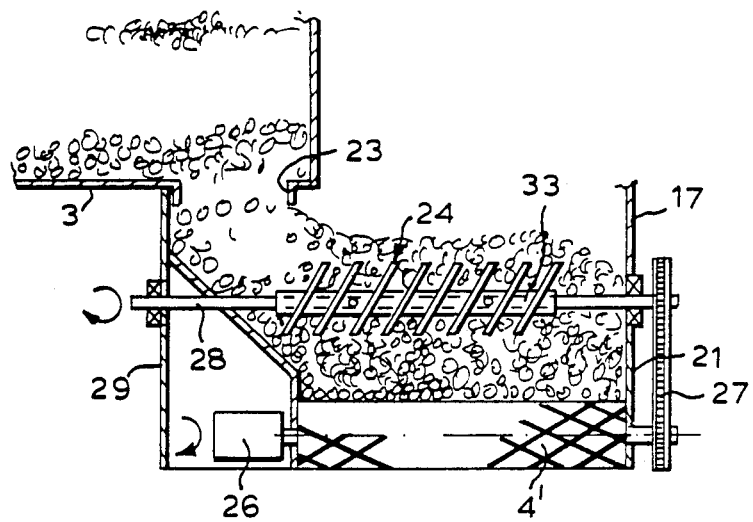
FIG. 7 is a diagrammatic longitudinal section through one extension hopper and part of the main hopper, in a different plane from that of FIGS. 4 to 6.

Adjacent each end part of the main hopper 3, an extension hopper 17 is mounted behind the front portion 3a and beneath the rear portion of the main hopper. Each extension hopper 17 is mounted between channel sections 18 serving as guide rails and receiving runners 19 carried by the extension hopper 17, so that the extension hopper is movable longitudinally of the main hopper 3. Each extension hopper 17 has an outer end wall 21 which abuts against the main hopper 3 in the retracted position of the extension hopper 17. The extended position of the extension hopper 17 is illustrated in FIGS. 2, 6, and 7; it can occupy any intermediate position, being movable by means of a hydraulic ram 22.

Near each end of the main hopper 3 its underside has an outlet 23 communicating with the associated extension hopper 17. Chippings entering the extension hopper 17 through the outlet 23 are distributed by an auger 24 and descend to a discharge roller 4'. The outlet 23 is provided with a main gate 25 and a secondary gate (not shown) to control the flow of material from the main hopper 3 to the extension hopper 17. The main gate 25 effectively changes the size of the outlet aperture from fully closed to fully open, with intermediate settings, and is set depending on the material flow characteristics. The secondary gate allows fine adjustment of flow. The roller 4' is driven by a hydraulic motor 26 and in turn drives the auger 24 via a chain transmission 27. The auger 24 is mounted at a variable position on a shaft 28 whose ends are carried by bearings fixed on the outer end wall 21 and an inner end wall 29 of the hopper 17.

A cut-off plate or baffle 31 fixed on the main hopper 3 projects through a slot in the end wall 29 of the extension hopper 17 and extends down to the level of the discharge roller 4'. When the extension hopper 17 is in the retracted position (see FIG. 4), the baffle 31 cuts off communication between the interior of the extension hopper 17 and the discharge outlet over the whole of the length of the discharge roller 4' (which, in this position, is directly behind the main discharge roller 4), thereby retaining the chippings in the extension hopper. As the extension hopper 17 is moved longitudinally outwards (FIG. 5), the part of the discharge roller 4' which still overlaps the main discharge roller 4 remains obstructed by the baffle 31. In the extended position (FIG. 6) substantially the full length of the roller 4' is available for discharge. During retraction, cut-off again occurs automatically in the overlapping section.

As with the main hopper, the chippings are discharged from the extension hopper 17 through a slot defined between the discharge roller 4' and a flexible rubber section 16'. The rollers 4,4' rotate in opposite directions at the same speed (related to the speed of travel of the spreader). The rate of application of the chippings can be set by moving the rubber sections 16,16' towards or away from the rollers 4,4' by means of a screw mechanism (not shown) before spreading commences. As illustrated in FIGS. 8 and 9, the rubber sections 16,16' serve as a safety device, if any oversize foreign body 32 gets into the aggregate, by distorting and allowing the body 32 to be ejected without damage to the hopper. Referring additionally to FIGS. 1 and 10, it can be seen that the contra-rotating rollers 4,4' discharge towards a vertical plane lying between them, so that the chippings are deposited along a straight line (FIG. 10).

As shown in FIGS. 12 to 14, the auger 24 comprises a sleeve 33 on which oblique vanes 34 for agitating the chippings and moving them along the auger are welded. Such an auger can be produced simply, without the use of special equipment or highly skilled labour. Augers of different pitch, diameter, and length can be easily made. The sleeve 33 has a hole 36 for receiving a bolt to lock it to the shaft 28 (FIG. 7) at a selected position. More than one sleeve 33 may be fitted on the shaft 28, as shown in FIG. 7. The edges of the vanes 34 are hard faced, as indicated at 37, to reduce wear.

The three hydraulic motors 7,26 are fed in series by a road-speed-related hydraulic system, but with individual solenoid-operated control giving the ability to isolate any motor if so desired. A master control solenoid allows the three motors to be pre-set (before starting working) in either their ON or their OFF position, a master switch then being used to simultaneously control all three motors when working. Each motor is protected by its own relief valve and the whole system is protected by a master relief valve which is set at a higher pressure and serves to protect the hydraulic pump. A hydraulic flow control valve allows the speed of the three motors to be varied simultaneously in relation to road speed, for fine adjustment of the rate of application of the aggregate while the machine is working.

The spreader is capable of undertaking different types of spreading work and therefore has an extended working calendar. One type of work is surface dressing, in which aggregate is applied at 1 to 10 km/h to a sprayed bitumen surface, to seal a road from ingress of moisture and frost damage and to give skid resistance at an economical cost compared with other surfacing methods. Surfacing dressing can only be carried out successfully during limited periods of dry and temperate weather; in the U.K. the period available may be from April to September but it can sometimes be as short as June to August. To extend the utilization period of the machine during a twelve-month period, another type of work can be undertaken, known as pre-coated chipping on hot asphalt, in which aggregate coated with a film of bitumen is spread at 3 to 15 m/min on fresh paver-laid hot asphalt. Subsequently, a roller is used to push the coated aggregate into the asphalt surface; the coated aggregate improves skid-resistance. To enable a simple change of drive ratios, mounting points are provided to allow mounting and removal of adaptor gearboxes fitted with hydraulic motors. All hydraulic connections are fitted with quick-release couplings, enabling fast change-overs with no loss of hydraulic oil. The rubber section 16,16' to be used in pre-coated chipping spreading is more rigid than that to be used in surface dressing, because of the lower speed of operation.

FIG. 11 illustrates the operation of the spreader on a road whose left-hand side (in the direction of travel) is uneven and whose right-hand side gradually narrows. The left-hand extension hopper 17 is retracted at point C and is then extended and retracted alternately as it passes points D, E, F, and G in sequence. At the same time the right-hand extension hopper 17 starts in the extended position at point A and is gradually retracted as it travels to point B. Thus the whole width of the road is covered in a single pass.

I claim:

1. Apparatus for spreading flowable material, comprising an elongate main hopper having means for discharging the material over substantially its whole length, an extension hopper also having means for discharging the material over substantially its whole length, the extension hopper being mounted adjacent the main hopper and being movable longitudinally of the main hopper between a retracted position and an extended position in which it projects beyond one end of the main hopper, thereby enabling variation of the combined width of the hoppers, and means for cutting off communication between the discharging means of the extension hopper and the major part of the interior of the extension hopper over a width corresponding to the longitudinal overlap between the main hopper and the extension hopper.

2. Apparatus as claimed in claim 1, in which the extension hopper communicates with the main hopper.

3. Apparatus as claimed in claim 2, in which the extension hopper communicates with the main hopper through an outlet in the underside of the main hopper.

4. Apparatus as claimed in claim 1, in which the cut-off means comprises a baffle fixed on the main hopper.

5. Apparatus as claimed in claim 1, in which the discharging means of the main hopper and the extension hopper lie on opposite sides of an imaginary vertical plane and discharge towards that plane.

6. Apparatus as claimed in claim 1, in which the discharging means comprise driven rollers.

7. Apparatus as claimed in claim 6, in which each discharge roller cooperates with a resiliently deformable counter-member to define a discharge slot.

8. Apparatus as claimed in claim 7, in which the counter-member is movable to vary the slot width.

9. Apparatus as claimed in claim 6, in which the discharge rollers are driven by respective hydraulic motors hydraulically connected in series.

10. Apparatus as claimed in claim 1, in which the extension hopper contains means for distributing the material across the length of the extension hopper.

11. Apparatus as claimed in claim 10, in which the distributing means comprises an auger.

12. Apparatus as claimed in claim 11, in which the auger comprises oblique vanes mounted on an elongate rotatable body.

13. Apparatus as claimed in claim 1, having two said extension hoppers, one at each end of the main hopper.

* * * * *